Oct. 17, 1961   B. F. McNAMEE   3,005,145
REGULATED VOLTAGE SUPPLY
Filed Aug. 12, 1957

BERNARD F. McNAMEE,
INVENTOR.

BY *Reed C. Lawlor*
ATTORNEY.

United States Patent Office 3,005,145
Patented Oct. 17, 1961

3,005,145
REGULATED VOLTAGE SUPPLY
Bernard F. McNamee, Altadena, Calif., assignor to Dressen-Barnes Corporation, Pasadena, Calif., a corporation of California
Filed Aug. 12, 1957, Ser. No. 677,570
5 Claims. (Cl. 321—19)

This invention relates to improvements in regulated power supplies and particularly to regulated voltage supply units that employ magnetic amplifiers as regulators.

The particular type of regulated power supply to which this invention is applicable is a regulated voltage supply of the type in which alternating current (A.C.) voltage applied to the input is converted into direct current (D.C.) voltage at the output. In such units, the voltage applied to a load connected to the output depends partly upon the magnitude of the load and partly upon the amplitude of the alternating current voltage applied to the input. In the past, magnetic amplifiers have been used as series regulating elements to counteract the changes in the output voltage that would otherwise occur either when the load changes or when the amplitude of the A.C. input voltage changes. Magnetic amplifiers employed in such power supplies have generally employed four windings linked with saturable cores composed of materials having so-called rectangular hysteresis loops. These magnetic amplifiers cooperate with rectifiers and with feedback-circuits to produce the desired regulated D.C. voltage at the output. One of the windings, called a gate winding, carries the gated current that is conducted from the input to the output. The other three windings carry control currents that control the gating action of the magnetic amplifier to control the gated current. In this gating action, the current in one of the control windings is controlled according to the voltage appearing in the output circuit to counteract changes in output voltage. In this gating action, the current in a second control winding is controlled in accordance with the current flowing to the output for counteracting output voltage changes that would otherwise be caused by a change in load current. In applications in which no changes in load are expected, this control winding is omitted. In order to reduce the range of control required by the aforementioned first and second control winding, the current in a third control winding, known as a bias winding, is controlled in accordance with the voltage impressed upon the input of the regulated voltage supply.

In accordance with this invention, the bias winding that is controlled by the A.C. voltage impressed on the input is eliminated and a single control winding is controlled in part by a backward-feeding circuit that is responsive to the output voltage and in part by a forward-feeding circuit that is responsive to the input voltage but is not responsive to the output voltage.

More particularly, in accordance with this invention, a magnetic amplifier is connected in a series regulator circuit between the input and the output, and the current flowing in a control winding of the magnetic amplifier is controlled in accordance with a voltage generated in a thermally variable resistance through which two components of control current flow. One current component varies in accordance with the output voltage and the other current component is controlled only in accordance with the input voltage. More particularly, a shunt circuit including a thermally variable resistor is connected across the output of the power supply and the control winding is connected in a backward-feeding relationship to provide a negative feed-back control to the magnetic amplifier. The thermally responsive element is not only controlled in accordance with the voltage appearing at the output, but it is also controlled through the action of a forward-feeding circuit that supplies current thereto in accordance with the alternating current voltage impressed upon the input.

With the arrangement of this invention, large changes in the amplitude of the input A.C. voltage cause the power supply to be regulated through the action of the forward-feeding circuit and changes in the output voltage also produce regulation through the action of the backward-feeding circuit. In addition, where the power supply unit is designed for use with loads of widely different values, a series resistor is connected in the current line between the input and the output and the voltage appearing across this resistor is employed to control an auxiliary winding in the magnetic amplifier in order to compensate very nearly completely for variations in load.

The novel features which are characteristic of this invention will be set forth with particularity in the claims. The invention itself, however, both as to organization and method of operation will be best understood by reference to the following description of the embodiment thereof which is illustrated in the single drawing in which:

Figure 1:
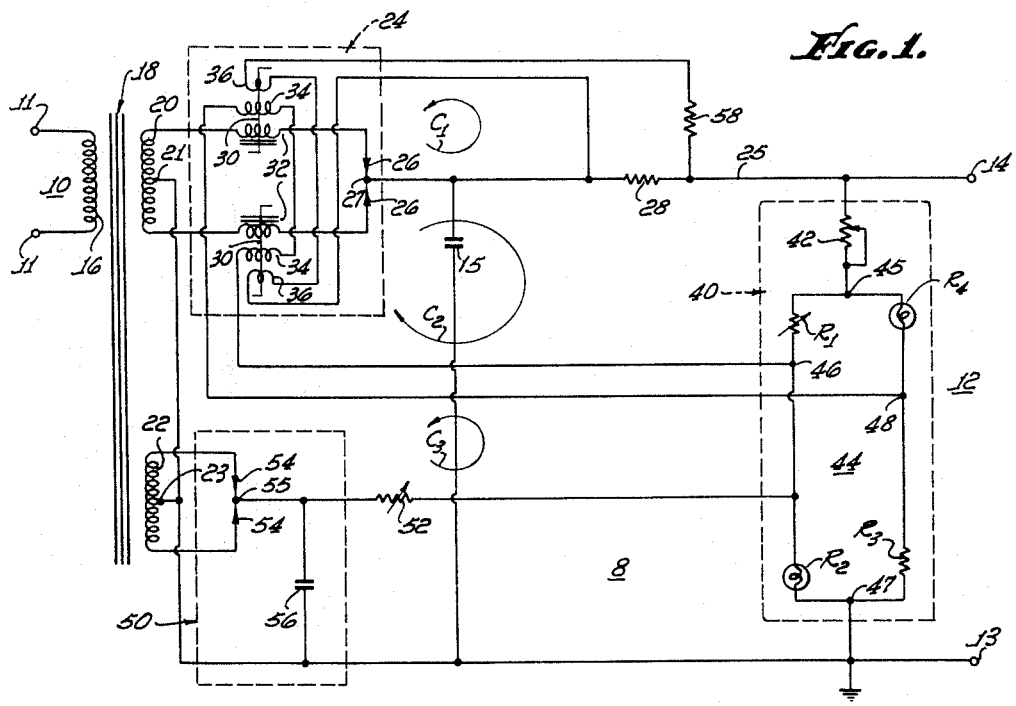
FIG. 1 is a schematic wiring diagram of a regulated power supply embodying this invention.

Referring to FIG. 1 there is illustrated a regulated power supply 8 embodying the present invention and having an input 10 and an output 12.

When an A.C. voltage in a suitable range is impressed upon input 10 of the regulated power supply 8, a regulated D.C. voltage appears across the output 12. The voltage impressed upon the input 10 may be and generally is unregulated, but the voltage appearing across the output 12 is closely regulated, being of substantially constant value. The input 10 has two input terminals 11. In the specific arrangement illustrated, the output 12 has a grounded negative terminal 13 and a floating positive terminal 14.

The input terminals are connected to opposite ends of a primary winding 16 of a transformer 18 that has two secondary windings 20 and 22, and each of the secondary windings 20 and 22 is provided with a center tap 21 and 23, respectively, which are connected together and to the grounded negative output terminal 13. A series-connected regulating unit 24 is connected in the floating current-line 25 between the secondary winding 20 and the positive output terminal 14. The regulating unit 24 comprises a balanced, single-phase, full-wave rectifier circuit including a pair of diode rectifiers 26, connected face-to-face to a common junction 27 which is connected to the positive output terminal 14 through a control resistor 28 in the current line 25. The regulating unit 24 also comprises a pair of magnetic amplifiers 30 that have gate windings 32 which are connected between the respective rectifiers 26 and the opposite terminals of the secondary winding 20.

Each of the magnetic amplifiers comprises a closed, that is, air-gap-free, core 31 composed of a ferromagnetic material having a so-called rectangular hysteresis loop. Such a material may be a nickel-iron alloy, such as Deltamax or Orthonol, or it may be a grain-oriented silicon steel such as Hypersyl. These materials are most effective, though other saturable ferromagnetic materials may also be used. The cores themselves may be of the tape-wound type. Each of the magnetic amplifiers 30 also comprises a main control winding 34 and an auxiliary control winding 36. Cores with air gaps may also be employed though systems employing cores of this type are not as satisfactory as those employing air-gap-free cores.

A shunt control circuit 40 is connected across the output of the regulated voltage supply. The upper or positive end of the control circuit 40 is connected between the series-resistor 28 and the floating output terminal 14 and the lower end is connected to the grounded output terminal 13. The shunt circuit 40 comprises a rheostat or variable resistor 42 connected in series with a Wheatstone bridge 44. One branch of the bridge 44 comprises first and second resistors $R_1$ and $R_2$ connected successively in adjacent arms in that branch of the bridge. The other branch of the bridge comprises third and fourth resistors $R_3$ and $R_4$ connected successively in adjacent arms of the latter branch. The first and third resistors $R_1$ and $R_3$ are connected in one pair of diagonally opposite arms, and the second and fourth resistors $R_2$ and $R_4$ are connected in the other diagonally opposite arms. The first and third resistors $R_1$ and $R_3$ have resistance values which are substantially independent of temperature. The second and fourth resistors $R_2$ and $R_4$ are thermally variable; in fact, having positive temperature coefficients of resistance. The resistors $R_1$ and $R_3$ of constant resistance may be in the form of wire-wound resistors formed by a material having a low temperature coefficient of resistivity, such as constantan. The two thermally responsive resistors $R_2$ and $R_4$ may be provided by the tungsten filaments of two incandescent lamps such as Westinghouse lamps designated by the number 1815.

For maximum effectiveness, the rheostat 42 is connected at the upper end of the shunt circuit and the bridge 44 at the lower end. The upper input junction 45 of the bridge forms the junction between the adjacent ends of the first and fourth resistors $R_1$ and $R_4$, which are in the upper arms of the bridge 44. The other input junction 47 of the bridge lies between the second and third resistors $R_2$ and $R_3$, which lie in the adjacent lower arms of the bridge 44. One output terminal 46 of the bridge lies between the resistor $R_1$ in adjacent arms of one branch of the bridge and the other output terminal 48 lies between the resistors $R_3$ and $R_4$ that lie in the adjacent arms of the other branch of the bridge. The resistors $R_1$ and 42 are adjustable to facilitate initial adjustment of the regulator.

A capacitor 15 is connected across the output of the regulated voltage supply and prior to the series-resistance 28 in order to reduce ripple in the voltage appearing in the output 12.

A full wave rectifier 50 is connected across the secondary winding 22. This full wave rectifier 50 supplies D.C. voltage through a resistor 52 to the thermally variable resistor $R_2$. The rectifier 50 comprises a pair of diode rectifiers 54 connected face-to-face to a common junction 55 which is connected to the adjustable resistor 52. A capacitor 56 is connected in the output of the rectifier 50 to reduce ripple.

The auxiliary windings 36 are connected in a positive feedback manner in series with each other and with a resistor 58 across the series resistance 28. The backward-feeding positive feedback circuit $C_1$ thus provided serves to minimize variations in voltage that would otherwise appear across the output 12 when the load connected to the output is changed. The winding 36 and resistors 28 and 58 are omitted when the voltage supply 8 is to be used under conditions where the load current is nearly constant.

The two main control windings 34 of the magnetic amplifiers 30 are connected in series across the output terminals 46 and 48 of the bridge, thus providing a backward-feeding, negative feedback regulating circuit $C_2$ and a forward-feeding, regulating circuit $C_3$. The backward-feeding circuit $C_2$ responds to changes in output voltage that appear across the bridge circuit and counteracts such changes. The forward-feeding circuit $C_3$ responds only to changes in the input voltage, that is to changes in input voltage but not to changes in output voltage, and tends to minimize any resultant changes in output voltage.

Looked at very broadly, the Wheatstone bridge 44 operates to reduce changes that would otherwise occur in the output voltage, due either to a change in load or to changes in the amplitude of the A.C. voltage applied to the input. This control action is effected partly by the backward-feeding action provided by the positive feedback circuit $C_1$ connected to the auxiliary windings 36. This control action is also due partly to the backward-feeding action of circuit $C_2$ provided by the connections between the shunt circuit 40 and the main control windings 34 and partly to the forward-feeding action of circuit $C_3$ provided by the rectifier 50 and the resistor 52. As indicated above, the positive feedback circuit $C_1$ is especially useful when large changes in load are likely to occur.

Figure 2:
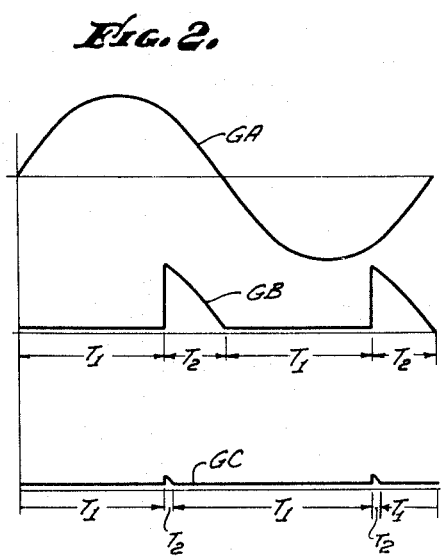
FIG. 2 is a graph showing how the current at the output of the rectifier of FIG. 1 varies as a function of time under different conditions.
Figure 3:
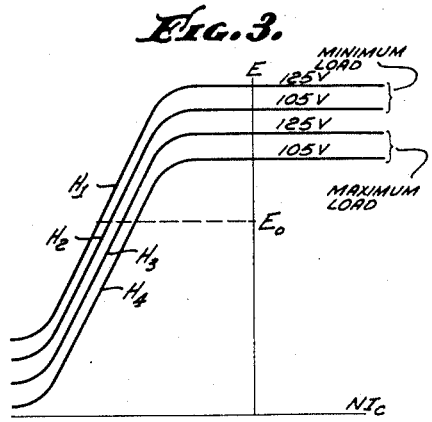
FIG. 3 is a graph showing how the output voltage varies with control current for different values of input voltage, and output load.

In order to understand the operation of this invention more fully, reference is made to FIGS. 2 and 3. In FIG. 2, the graph GA represents a voltage wave corresponding to the A.C. voltage impressed on the input. Graphs GB and GC represent how the gated current in the output of the rectifier unit 24 varies as a function of time under certain conditions. More particularly, graph GB illustrates how the gated current varies when a purely resistive load is connected across the output of the rectifier unit, or in the alternative when the power supply is first energized by applying A.C. voltage to the input 10. Graph GC, however, illustrates how the current varies as a function of time when operating under normal conditions after it has attained a stable condition. No attempt is made to indicate the correct phase relations between the three graphs.

As indicated by graphs GA and GB, each half-cycle of operation is divided into two time intervals, $T_1$ and $T_2$. During one of these time intervals $T_1$ very little current flows through either of the gating windings 32. During the time interval $T_2$ a pulse P of current flows to junction 27. The duration and amplitude of the pulse P depends in part upon the voltage present across the capacitor 15 and partly on the current flowing through the control windings 34 and 36. Thus when no voltage is present across the capacitor 15, the current pulses P are large as illustrated in graph GB, but when a condition of stable operation is attained, in which the normal voltage is present across the output capacitor 15, the pulses P are small, as illustrated in graph GC.

By virtue of the positive feed-back characteristic of the backward-feeding circuit $C_1$, when the load is increased, that is where the resistance of the load is decreased, the current flowing through the auxiliary control windings 36 is changed in such a way as to shift the gating time of the magnetic amplifiers 30 in such a direction as to increase the size of the current pulses P. In this way, in effect, the requirements of the load are more readily satisfied thus tending to maintain the voltage across the output 12 more nearly constant.

When the load itself is constant, if for any reason the voltage across the output shunt circuit 40 varies, the backward-feeding circuit $C_2$ operates in such a way as to oppose the change in voltage. Thus, if the voltage across the output suddenly increases, an increase occurs in the current flowing through the control windings 34, thus reducing the magnitude of the pulses supplied by the series regulator unit 24. Conversely, if the voltage across the output suddenly decreases, an increase occurs in the current flowing through the control windings 34, thus reducing the magnitude of the pulse supplied by the series regulating unit 24.

In the best embodiment of this invention now known, in which thermally variable resistors $R_2$ and $R_4$ are employed in the bridge circuit 44, the resistance values of the resistors $R_2$ and $R_4$ increase when the voltage across the output 12 increases, thereby unbalancing the bridge at 44 in such a direction that the control current fed back through the control circuit $C_2$ to the control windings 34 is increased more than if the resistance values were constant. In this way the regulating action is increased and accelerated. In practice, for best effect, the bridge 44 is unbalanced during normal operation and the unbalance is increased with increase in current to the shunt control circuit 40. This advantage may be achieved by employing an arrangement in which the values of the resistances of the resistors $R_2$ and $R_4$ are greater than the values of the resistances of the resistors $R_1$ and $R_3$.

The forward-feeeding circuit $C_3$ is employed to aid backward-feeding circuits $C_1$ and $C_2$ in stabilizing the output of the voltage supply. When the A.C. voltage applied to the input 10 increases, there is a corresponding increase in the current fed by the rectifier 50 to the thermally responsive resistor $R_2$. The component of current flowing through the resistor $R_2$ from the rectifier 50 has the same sign or polarity as the component of current flowing through the resistor $R_2$ from the series regulator unit 24. Thus, the increase in current through resistor $R_2$ caused either by an increase in the A.C. input voltage applied to winding 22 or by an increase in the output voltage applied to the shunt control circuit 40 tends to oppose the increase in the output voltage that would occur in the absence of the control circuits.

During stable operation, when an increase occurs in the A.C. input voltage, the value of the resistor $R_2$ increases and the voltage across this resistor increases in a corresponding manner. Such increase is due partly to the change in resistance and partly due to the fact that both components of current supplied thereto increase. As a result, the voltage appearing across the output of the bridge circuit 44 is increased, thus stabilizing the output voltage.

Similarly, the decrease in current through resistor $R_2$ caused either by a decrease in the A.C. input voltage or by a decrease in the output voltage tends to oppose the decrease in the output voltage that would occur in the absence of the control circuits. During stable operation, when a decrease occurs in the A.C. input voltage, the value of the resistor $R_2$ decreases and the voltage across this resistor decreases in a corresponding manner. Such decrease is due partly to the decrease in resistance and partly to the fact that both components of current supplied thereto decrease. As a result the voltage appearing across the output of the bridge circuit 34 is decreased, thus stabilizing the output voltage. In any event when the output voltage changes the values of resistances of both resistors $R_2$ and $R_4$ change, thus enhancing the control effect of the bridge.

In FIG. 3 graphs representing static characteristics of the regulated voltage supply 8 in the absence of the control circuits $C_2$ and $C_3$ are shown, but with the control circuit $C_1$ in use. Graphs $H_1$ and $H_2$ represent the output voltage E for a minimum load, when the input voltage has the values 125 volts and 105 volts, respectively. Graphs $H_3$ and $H_4$ represent the output voltage for a maximum load, when the input voltage has the values 125 volts and 105 volts, respectively. Each of these curves represents the manner in which the voltage E appearing across the output capacitor 15 varies as a function of the current $I_c$ supplied to the control windings 34 for a given A.C. input voltage and a given load. Values of voltage E are plotted as ordinates and abscissae represent corresponding values of ampere-turns $NI_c$ where N is the number of turns in each of the windings 34 and $I_c$ is the control current flowing therethrough.

It is to be noted that the graphs $H_1$, $H_2$, $H_3$ and $H_4$ for the particular ranges of input voltage and load lie one above the other in the order named. In this graph the dotted line represents a desired output voltage $E_o$. In practice, of course, the output voltage varies somewhat as a function of the load and as a function of the input voltage. The intersections of this dotted line with the graphs $H_1$, $H_2$, $H_3$, and $H_4$ represent the values of the control current required to achieve perfect regulation. Here it will be noted that to approach perfect regulation, a relatively small change is required in the control current $I_c$ to account for changes in load, but that a relatively large change in control current is requird to compensate for even relatively small changes in input voltage. In practice, of course, the effectiveness of the control current $I_c$ depends not only on the magnitude of that current but also on the number of turns N of each of the control windings 34 linking the cores 31.

In accordance with this invention the magnitude of the two components of current fed to the bridge 44 through the backward-feeding circuit $C_2$ and the forward-feeding circuit $C_3$ are so proportioned that for a fixed output load the output voltage $E_o$ is very nearly constant, irrespective of changes in the input voltage. Suitable proportioning is achieved by adjustment of the resistors 42, 52, and $R_1$.

In practice, for maximum effectiveness, the value of the output voltage $E_o$ is established at a point between the knee of the uppermost graph $H_1$ and the shoulder of lowermost graph $H_4$, and the value of the control current $I_c$ is established at a value corresponding to a median voltage and a median load. In any event, it will be noted that the polarity of the control current $I_c$ is the same throughout the range of operation, and that the bridge is unbalanced at all values of voltage and load.

It will be understood, of course, that the invention is not limited to the specific embodiment which has been illustrated and described in detail herein, but that many changes may be made therein without departing from the principles of this invention. It will be understood, for example, that it is not necessary to employ two variable resistors and in fact that some of the advantages of this invention may be achieved by an arrangement in which none of the resistors change in value with the currents flowing therethrough. More particularly, it will be understood that when variable resistances are used, these resistances need not change in value with temperature, but that they may change in value instantaneously with the values of the currents flowing through them. Furthermore, it will be understood that the series regulator unit may be of a different type than that illustrated, and more particularly that some of the advantages of the invention may be obtained when only a half wave rectifier system is employed and that other full wave rectifiers may be used. It is, therefore, to be understood that the invention may be embodied in many other forms within the scope of the appended claims.

The invention claimed is:

1. In a regulated power supply in which alternating current voltage applied to the regulator input is converted into direct current voltage at the regulator output, and employing a saturable reactor and a rectifier connected in a main circuit between said regulator input and said regulator output, said reactor having magnetic core means and including control means for varying the saturation of said core means whereby the average current flowing through said main circuit is varied, the combination therewith of:
    a Wheatstone bridge circuit having a pair of bridge input terminals and a pair of bridge output terminals, said bridge circuit including in one arm thereof a resistor having a resistance that varies with the current fed therethrough;
    means connecting said bridge input terminals across said regulator output, the voltage across said bridge output terminals changing when the voltage at said regulator output changes irrespective of any changes in voltage across said regulator input;
    means separately controlled by the alternating current voltage impressed across the regulator input for feeding a current to said bridge through an auxiliary circuit, the voltage across said bridge output terminals also changing when the voltage across said regulator input changes; and means connecting said bridge output terminals to said control means for varying the saturation of said core means to counteract changes in regulator output voltage.

2. In a regulated power supply in which alternating current voltage applied to the regulator input is converted into direct current voltage at the regulator output, and employing a saturable reactor and a rectifier connected in a main circuit between said regulator input and said regulator output, said reactor having magnetic core means and including control means for varying the saturation of said core means whereby the average current flowing through said main circuit is varied, the combination therewith of:

a Wheatstone bridge circuit having a pair of bridge input terminals and a pair of bridge output terminals, said bridge circuit including in one arm thereof a resistor having a resistance that varies with the current fed therethrough;

means connecting said bridge input terminals across said regulator output, the voltage across said bridge output terminals changing when the voltage at said regulator output changes irrespective of any changes in voltage across said regulator input;

means separately controlled by the alternating current voltage impressed across the regulator input and connected between one of said bridge output terminals and one of said bridge input terminals for feeding a current to said bridge through an auxiliary circuit, the voltage across said bridge output terminals also changing when the voltage across said regulator input changes; and means connecting said bridge output terminals to said control means for varying the saturation of said core means to counteract changes in regulator output voltage.

3. In a regulated power supply having a regulator input and a regulator output in which alternating current voltage applied to the regulator input is converted into direct current voltage at the regulator output, and employing a saturable reactor and a rectifier connected in a main circuit between said regulator input and said regulator output, said reactor having magnetic core means and including first and second control means for varying the saturation of said core means whereby the average current flowing through said main circuit is varied, the combination therewith of:

A Wheatstone bridge circuit having a pair of bridge input terminals and a pair of bridge output terminals, said bridge circuit including in one arm thereof a resistor having a resistance that varies with the current fed therethrough;

means connecting said bridge input terminals across said regulator output, the voltage across said bridge output terminals changing when the voltage at said regulator output changes irrespective of any changes in voltage across said regulator input;

means separately controlled by the alternating current voltage impressed across the regulator input for feeding a current to said bridge through an auxiliary circuit, the voltage across said bridge output terminals also changing when the voltage across said regulator input changes irrespective of any changes at said regulator output;

means controlled by current flowing from said rectifier to said regulator output for operating said first control means to vary the saturation of said core means; and means connecting said bridge output terminals to said second control means for varying the saturation of said core means to counteract changes in regulator output voltage, the connections in such bridge circuit being such that changes in regulator input voltages and regulator output voltages that are of the same sign produce like changes in the current through said resistor whereby the resultant changes in resistance of said resistor act in the same sense to shift the gating time thereby jointly counteracting changes in output voltage.

4. In a regulated power supply in which alternating current voltage applied across a regulator input is converted into direct current voltage that appears at a regulator output, and employing a magnetic amplifier and a rectifier connected in a main circuit between said regulator input and said regulator output, said amplifier being characterized by a variable gating time throughout which a current pulse flows through said main circuit, said magnetic amplifier having magnetic core means and including control means for varying the flux in said core means whereby the gating time of said amplifier is varied, the combination therewith of:

a Wheatstone bridge circuit having a pair of bridge input terminals and a pair of bridge output terminals, said bridge circuit including in one arm thereof a resistor having a resistance that varies with the current fed therethrough;

means connecting said bridge input terminals across said regulator output, the voltage across said bridge output terminals changing when the voltage at said regulator output changes irrespective of any changes in voltage across said regulator input;

means separately controlled by the alternating current voltage impressed across the regulator input for feeding a current to said bridge through an auxiliary circuit, whereby the voltage across said bridge output terminals changes when the voltage across said regulator input changes irrespective of any changes at said regulator output; and means connecting said bridge output terminals to said control means for shifting the gating time of said amplifier to counteract changes in regulator output voltage.

5. A regulated power supply as defined in claim 1, in which the resistance of said resistor varies with the temperature of said resistor.

References Cited in the file of this patent

UNITED STATES PATENTS

| | | |
|---|---|---|
| 2,470,556 | Sven-Eric Hedstrom et al. | May 17, 1949 |
| 2,611,889 | Huge | Sept. 23, 1952 |
| 2,721,304 | Silver et al. | Oct. 18, 1955 |
| 2,733,402 | Bixby | Jan. 31, 1956 |
| 2,733,404 | Ogle | Jan. 31, 1956 |
| 2,752,551 | Bixby | June 26, 1956 |
| 2,790,127 | Hamilton | Apr. 23, 1957 |
| 2,810,877 | Silver | Oct. 22, 1957 |
| 2,875,396 | Christie et al. | Feb. 24, 1959 |
| 2,878,437 | Christie et al. | Mar. 17, 1959 |

FOREIGN PATENTS

| | | |
|---|---|---|
| 312,780 | Switzerland | Apr. 14, 1956 |